(12) United States Patent
Ann

(10) Patent No.: US 12,233,016 B2
(45) Date of Patent: Feb. 25, 2025

(54) HAND AND FOREARM THERAPEUTIC MASSAGE SYSTEM

(71) Applicant: Sarah Ann, Half Moon Bay, CA (US)

(72) Inventor: Sarah Ann, Half Moon Bay, CA (US)

( * ) Notice: Subject to any disclaimer, the term of this patent is extended or adjusted under 35 U.S.C. 154(b) by 611 days.

(21) Appl. No.: 17/644,780

(22) Filed: Dec. 16, 2021

(65) Prior Publication Data

US 2022/0241143 A1 Aug. 4, 2022

Related U.S. Application Data

(60) Provisional application No. 63/206,106, filed on Jan. 29, 2021.

(51) Int. Cl.
*A61H 15/00* (2006.01)
*A61H 1/00* (2006.01)
*A61H 7/00* (2006.01)
*F16F 1/12* (2006.01)

(52) U.S. Cl.
CPC ......... *A61H 15/0092* (2013.01); *A61H 1/008* (2013.01); *A61H 7/007* (2013.01); *A61H 2015/0014* (2013.01); *A61H 2201/0192* (2013.01); *A61H 2201/1418* (2013.01); *A61H 2201/1685* (2013.01); *F16F 1/121* (2013.01); *F16F 1/122* (2013.01)

(58) Field of Classification Search
CPC ...... A61H 7/00; A61H 15/00; A61H 15/0092; A61H 2015/0014; A61H 2015/0057; A61H 2016/0057; F16F 1/121–122
USPC ......... 601/115–131, 133; 267/172, 174–175, 267/177, 179
See application file for complete search history.

(56) References Cited

U.S. PATENT DOCUMENTS

| | | | | |
|---|---|---|---|---|
| 2,735,669 A | * | 2/1956 | Seiler | F16K 31/52408 137/413 |
| 3,583,396 A | * | 6/1971 | Landis | A61H 15/0092 601/125 |
| 4,573,657 A | * | 3/1986 | Sakamoto | B60N 2/502 248/575 |
| 5,885,232 A | * | 3/1999 | Guitay | A61H 7/008 601/123 |
| 8,424,895 B1 | * | 4/2013 | Stokes | B62H 3/10 280/297 |
| 9,011,356 B2 | * | 4/2015 | McClorey | A61H 15/00 601/122 |

(Continued)

*Primary Examiner* — Tu A Vo
*Assistant Examiner* — Alexander Morales
(74) *Attorney, Agent, or Firm* — Ivan E. Rozek; Savantek Patent Services

(57) ABSTRACT

A hand and forearm therapeutic massage system which includes a frame that supports easily exchangeable lower fixed roller and an upper vertically movable roller. When a person inserts his or her hand and forearm between the two rollers, the upper roller provides precisely adjustable downward force thus providing a massaging action on the user's hand or forearm. A removable side panel provides easy and quick access for removal and insertion of rollers for a specific diagnosis. A cam mechanism and attached knob located in the upper portion of the frame can adjust the spring pressure exerted on the upper roller. The cam adjustment knob protrudes beyond the side wall of the hollow frame and includes an indicating arrow that points to indices affixed to the side of the hollow frame to allow a person to accurately know the pressure setting he or she is on.

1 Claim, 17 Drawing Sheets

(56) References Cited

U.S. PATENT DOCUMENTS

| | | | |
|---|---|---|---|
| 12,036,171 B2* | 7/2024 | Cross | A61H 15/0092 |
| 2005/0159688 A1* | 7/2005 | Sakamoto | A61H 15/0092 |
| | | | 601/123 |
| 2007/0142755 A1* | 6/2007 | Kleiman | A61H 15/0092 |
| | | | 601/134 |
| 2012/0122338 A1* | 5/2012 | Gonzalez | H02G 3/18 |
| | | | 439/535 |
| 2012/0203151 A1* | 8/2012 | Kleiman | A61H 15/00 |
| | | | 601/112 |
| 2013/0043629 A1* | 2/2013 | Gousseinov | F16F 1/12 |
| | | | 267/172 |
| 2017/0231862 A1* | 8/2017 | Olschansky | A61H 15/0092 |
| | | | 601/128 |
| 2019/0038499 A1* | 2/2019 | Horowitz | A61H 15/00 |
| 2020/0061411 A1* | 2/2020 | Kelberman | A63B 21/00069 |
| 2020/0368101 A1* | 11/2020 | Nash | A61H 15/00 |

* cited by examiner

HAND AND FOREARM THERAPEUTIC MASSAGE SYSTEM

CROSS REFERENCE TO RELATED APPLICATIONS

This application claims priority to U.S. Provisional Patent Application, 63/206,106, filed Jan. 29, 2021, which is incorporated herein in its entirety by reference. STATEMENT REGARDING FEDERALLY SPONSORED RESEARCH OR DEVELOPMENT Not Applicable.

DESCRIPTION OF ATTACHED APPENDIX

Not Applicable

BACKGROUND OF THE INVENTION

This invention relates generally to the field of portable therapeutic massage devices and more specifically it relates to portable hand and forearm therapeutic massage devices used to treat and prevent hand and forearm injuries caused by repetitive stress such as carpal tunnel and other sport and work situations.

It is generally known by osteopaths, chiropractors, and massage therapists that compressive massaging of a person's hand and forearm can be a help in relieving pain and tension due to repetitive use of the hand during work or play activities. Therapeutic massage is outcome-based massage, primarily the application of specific treatment targeted to the specific problem a patient presents. To this end, several massaging device inventions have been patented to address this issue, such as James Engel's U.S. Pat. No. 5,643,182 which describes a massager having two opposing rollers that are spring biased so that as a person inserts a body part such as a hand or a foot, the rollers provide a massaging action to alleviate muscle pain, cramping or fatigue.

Paul Kleiman's application Ser. No. 12/969,540 improved Engel's massager by providing spring force adjustment, however it doesn't provide for a repeatable and predetermined force adjustment as well as for the two springs adjusted to exert near identical force on the upper roller. Additionally, Kleiman's design does not enable a user to choose different rollers, nor does it provide in use replacement capability, which is very useful when a user needs to treat multiple hand and/or forearm medical problems therefore requiring reconfiguring the massage device with differently shaped rollers. Engle's design allows for a time consuming and complicated roller replacement.

Olschansky et Al. (U.S. Pat. No. 10,278,889) a modular framework with multiple axes with rotatable balls and fixed spring in the frame sides. Olshansky's device improves on Kleiman's design by providing a variety of massaging ball assemblies, however by the same token, it is limited to balls and changing of the configuration can be cumbersome especially for users that already have hand problems.

McClenathen's massager (U.S. Pat. No. 2,230,890) is one of the pioneering devices, teaching a foot massager comprising three rollers, with only a center roller being adjustable and the adjustment of the massage pressure force developed by the rollers requires operating individual screws prone to creating unbalanced pressure forces.

There are other types of tools and techniques for use by medical massage professionals or to be used as a self-massage device. Most of these lack one or more aspects of features the instant invention strives to provide as will become obvious from the foregoing descriptions.

BRIEF SUMMARY OF THE INSTANT INVENTION

The primary object of the present disclosure is to provide a portable hand and forearm massaging system, for use by professional massage therapist or self-administered by a patient-user, comprising a massaging device and a set of rollers, shapes and materials of which corresponds to specific diagnoses and/or desired treatments that can provide short term soothing as well as long term repeatable therapeutic solution to many known forearm and hand problems, such as for example carpal tunnel, tennis elbow, and provide therapy for any muscle on the hand or forearm.

Other object of the present disclosure is to provide a user with the ability to quickly and easily reconfigure the massage device with replacing either one or both rollers with a roller and/or rollers more suitable for the desired therapeutical regime. A non-trivial feature for a user having hand and forearm medical problems.

Other object of the present disclosure is also to provide a user with the ability to easily and repeatedly adjust the massaging force pressure exerted by the upper roller to a predetermined force required to by the therapeutical regime even, a feature especially useful when individual treatment sessions are separated by extended time.

Yet another object of the present disclosure is to provide a user with the ability to precisely and repeatably change the characteristics of compression force change per angular unit of the compression adjustment knob rotational position change.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a portable hand and forearm massaging device that employs one rotatable vertically fixed roller and one rotatable vertically slidable spring force biased roller in a frame that allows a user to insert his or her hand and forearm into the space between the fixed roller and the spring biased roller to provide massaging action on the user's hand and forearm; said rollers construction and mounting providing for easy removal and replacement to give the user a choice of roller shapes producing differing massaging actions appropriate for the treated diagnosis; the spring biased roller force exerted on a user's hand being repeatably and precisely adjusted via a cam mechanism to quickly and easily provide greater or lesser massaging pressure using a selector allowing for predetermined repeatable force. The force adjustment cams of the massaging device can be easily replaced with cams of various shape therefore creating variable rate of force regimes corresponding to the angular change of the cam.

BRIEF DESCRIPTION OF THE DRAWINGS

The drawings constitute a part of this specification and include exemplary embodiments to the instant invention, which may be embodied in various forms. It is to be understood that in some instances various aspects of the instant embodiments may be shown exaggerated or enlarged to facilitate an understanding of the instant embodiment.

DETAILED DESCRIPTION OF THE PREFERRED EMBODIMENTS

Detailed descriptions of the preferred massage device embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
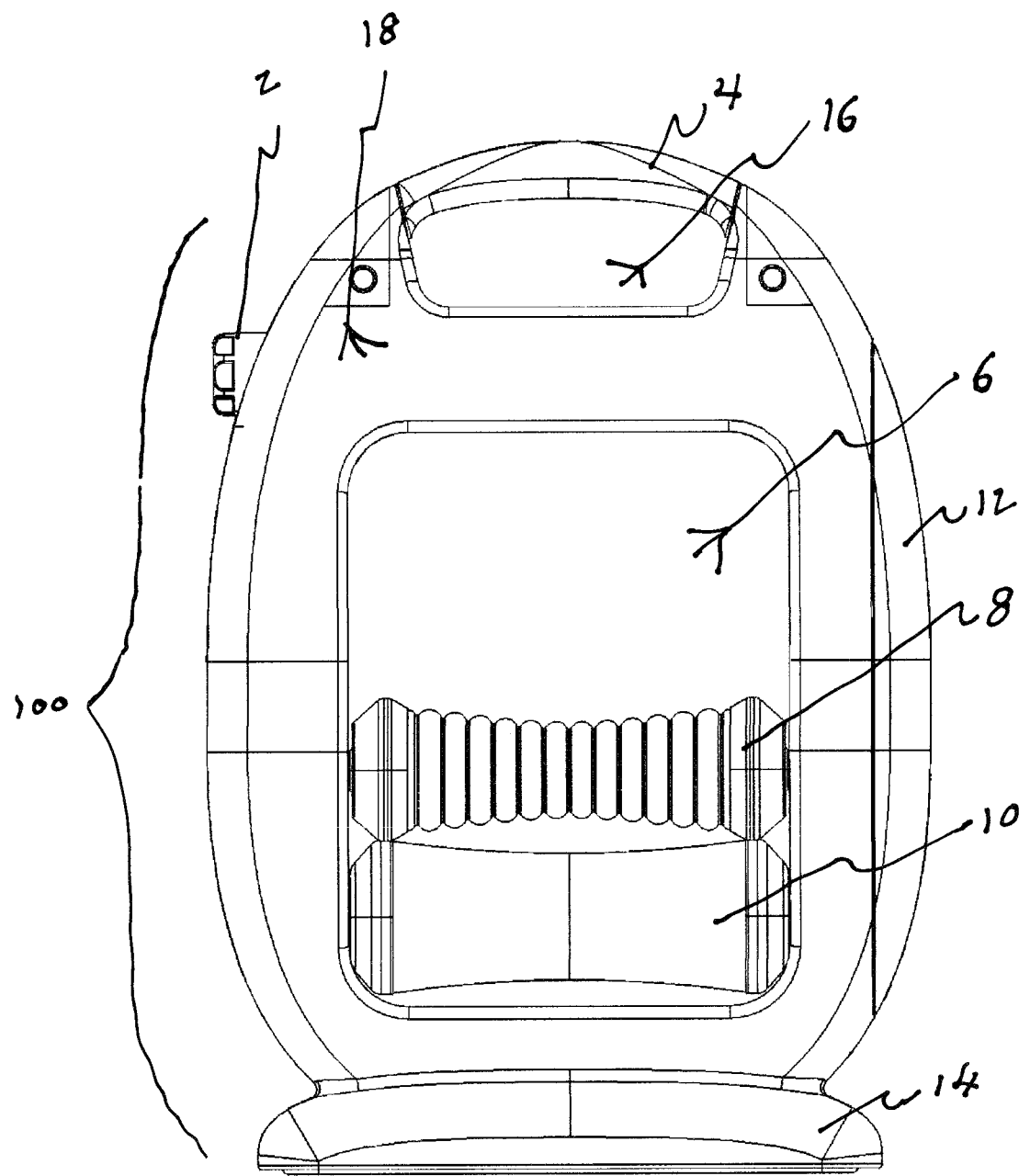
FIG. 1 is a rear view of the massage device embodiment.

Referring now to FIG. 1 we see a front view of the portable massage device 100. The massage device 100 as seen on FIG. 1 comprises a basically rigid housing 18, 19 with an open rectangular space 6 where a pair of massaging rollers is located, a handle 4, and a handle portion enclosing a cutout area 16. One stationary roller 10 and one vertically moveable roller 8 are mounted on cross shafts 26, 28 shown in FIG. 5. A rotatable knob 2 is used to adjust the resistance level it takes to lift the roller 8, wherein the resistance level to lift the roller 8 is the force exerted by the compression springs 58, 60, shown in FIGS. 6 through 11, on the upper moveable roller and consequently on the user's forearm and/or hand. Base portion 14 allows the massage device 100 to sit firmly on a tabletop or other horizontal surface. Additional rubber feet on the underside of the base portion 14 help hold the entire massage device 100 in place by preventing the massage device 100 from sliding during use. The preferred use of the massage device 100 is for a self-treating person to grasp the handle 4 with one hand and move the massaged hand and/or forearm between the rollers 8, 10 back and forth. Although the preferred use of the massage device 100 is to be located on a horizontal surface like a tabletop, it is not limited to be used in this manner only.

Figure 2:
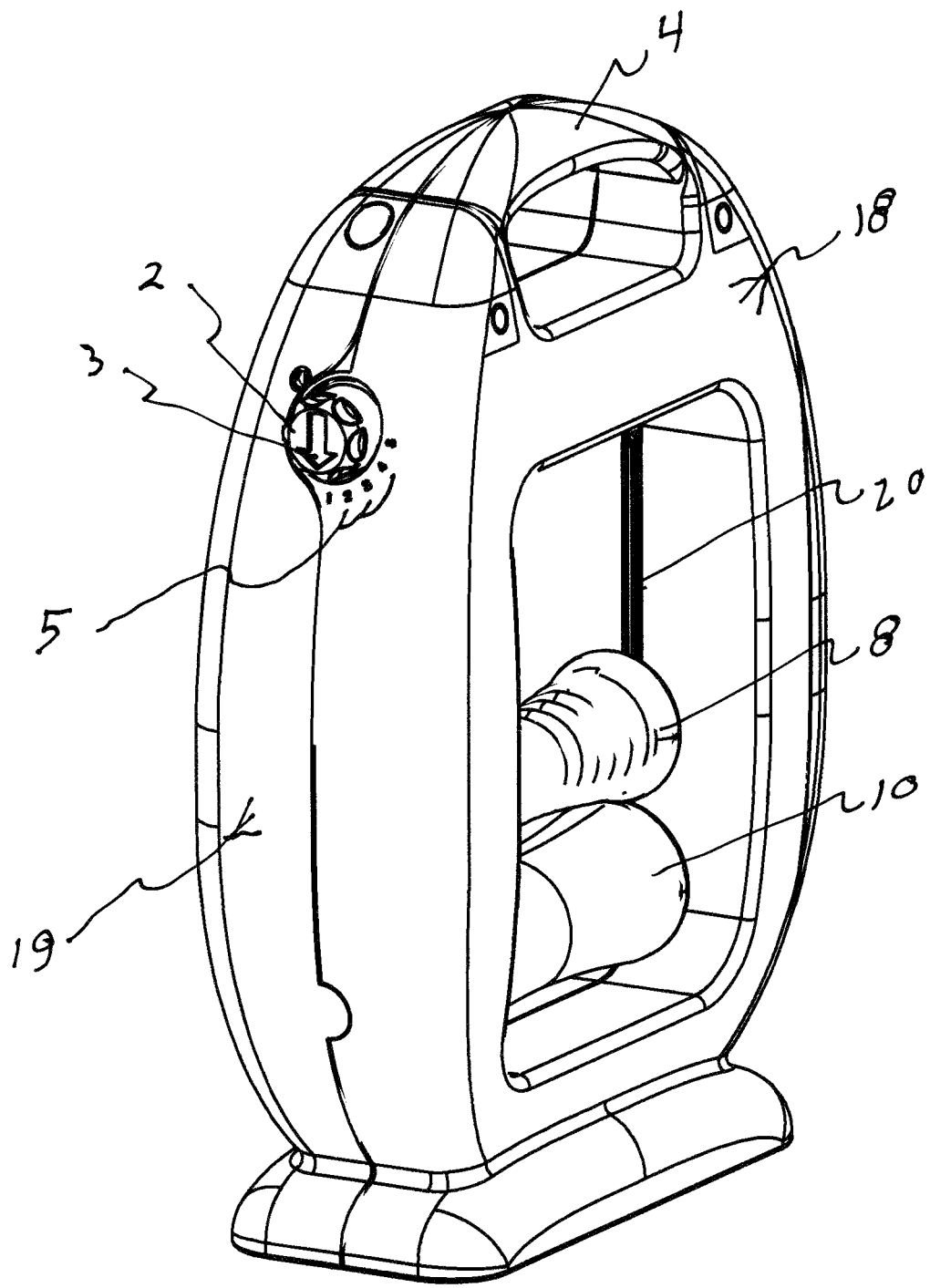
FIG. 2 is a perspective view of the massage device embodiment showing the rear and the right side.
Figure 6:
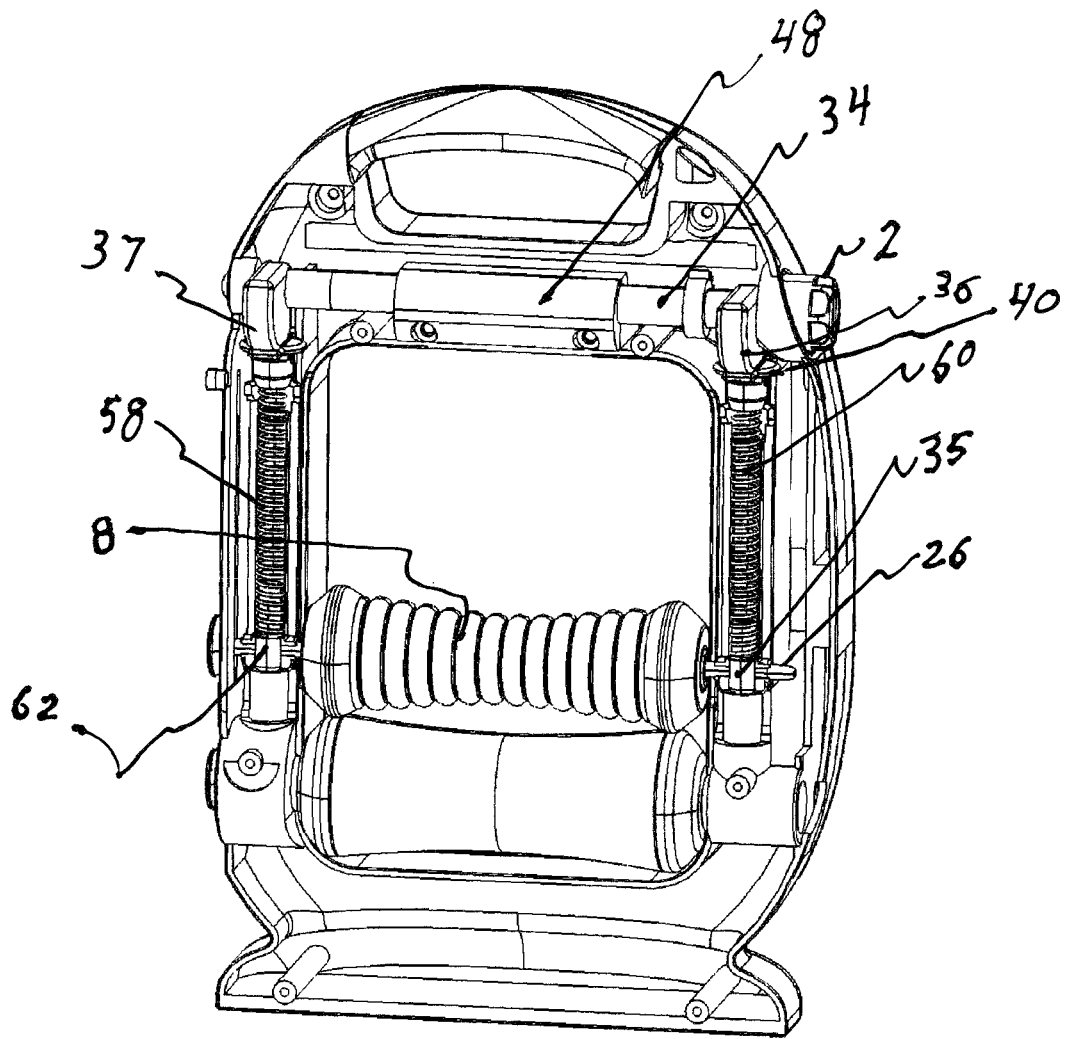
FIG. 6 is the view of the massage device embodiment with front cover removed.
Figure 12:
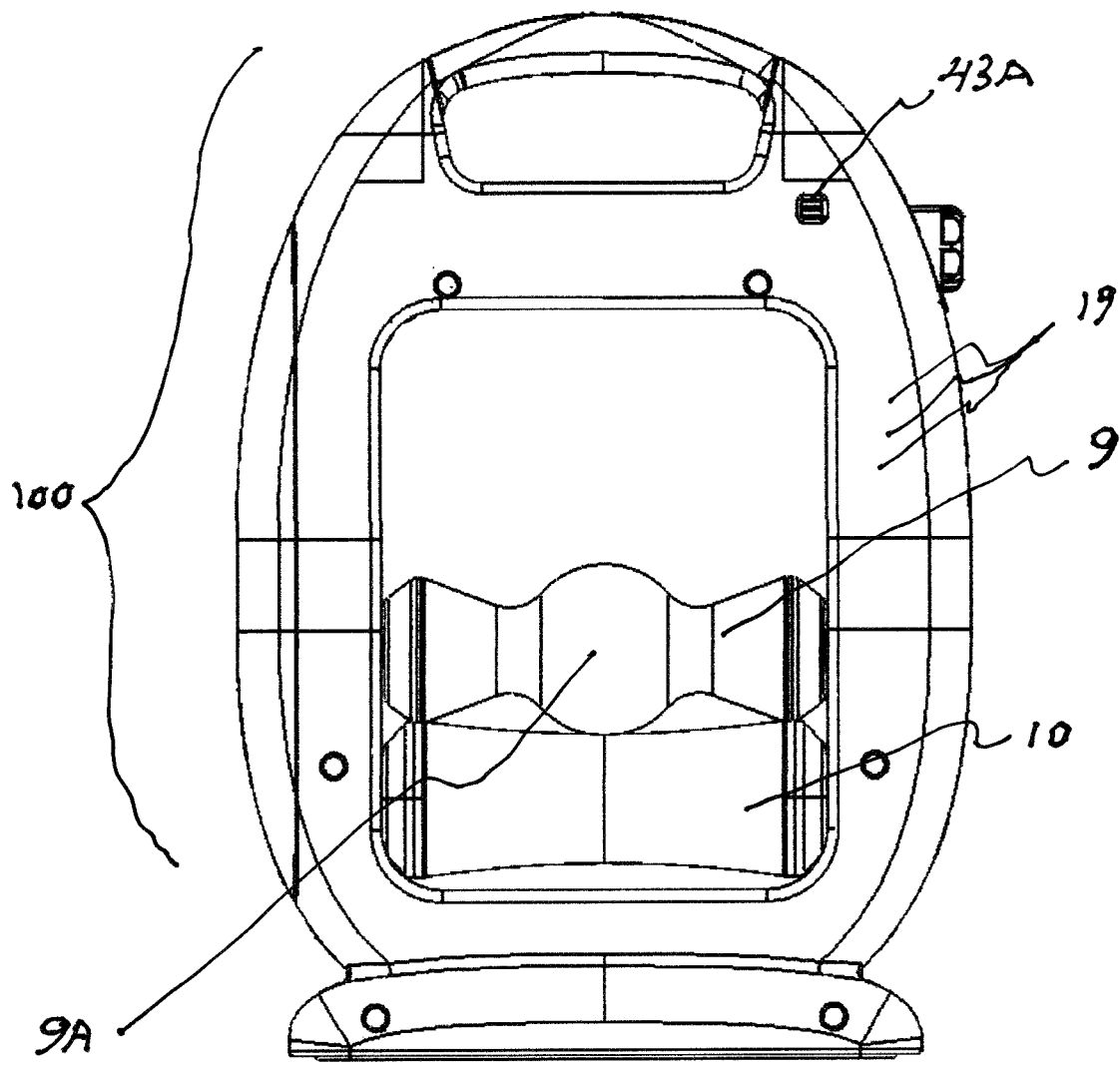
FIG. 12 is a front view of the massage device embodiment showing the pawl extended end.

FIG. 2 is a perspective view of the massage device 100 showing the right side which includes massaging force rotatable adjustment knob 2 with a pronounced indicating arrow 3 disposed on the knob 2 surface. The arrow 3 and the indices 5 disposed around the rotatable adjustment knob indicate the angular position of the cams 36, 37 shown in FIG. 7. A user rotating the knob 2 rotates the internal cams 36, 37 shown in FIG. 7, changing the compression force exerted by the compression springs 58, 60 as shown in FIG. 6, thus changing the force exerted by the roller on the user's forearm and/or hand. An extended end 43A of pawl 43 protrudes out of housing half 19 as shown in FIG. 12. Rotating the knob 2 in one direction increases the compression; to decrease the compression, the user turns the knob 2 in the opposite direction while simultaneously the user presses down on the pawl extended end 43A thereby disengaging pawl 43 from gear teeth 38. The indices 5 allow the user to know exactly how much pressure is being exerted on the springs 58, 60 at any time so that the user can have repeated control over the pressure over multiple use events.

The massage device mechanisms are enclosed in the rigid frame housing comprised of a rear hollow half 18 and a front hollow half 19. The front hollow half 19 houses all the mechanical components that make the massage device 100 work as will be discussed and illustrated hereinafter. Slot 20 and opposing slot 21 help guide the shaft 26 of roller 8 as it is forced up or down during use as a usesr inserts his or her hand or forearm between stationary roller 10 and upwardly mobile roller 8. It should be noted that a larger version of the present massage device 100 could also be used to massage a person's feet and lower leg.

Figure 3:
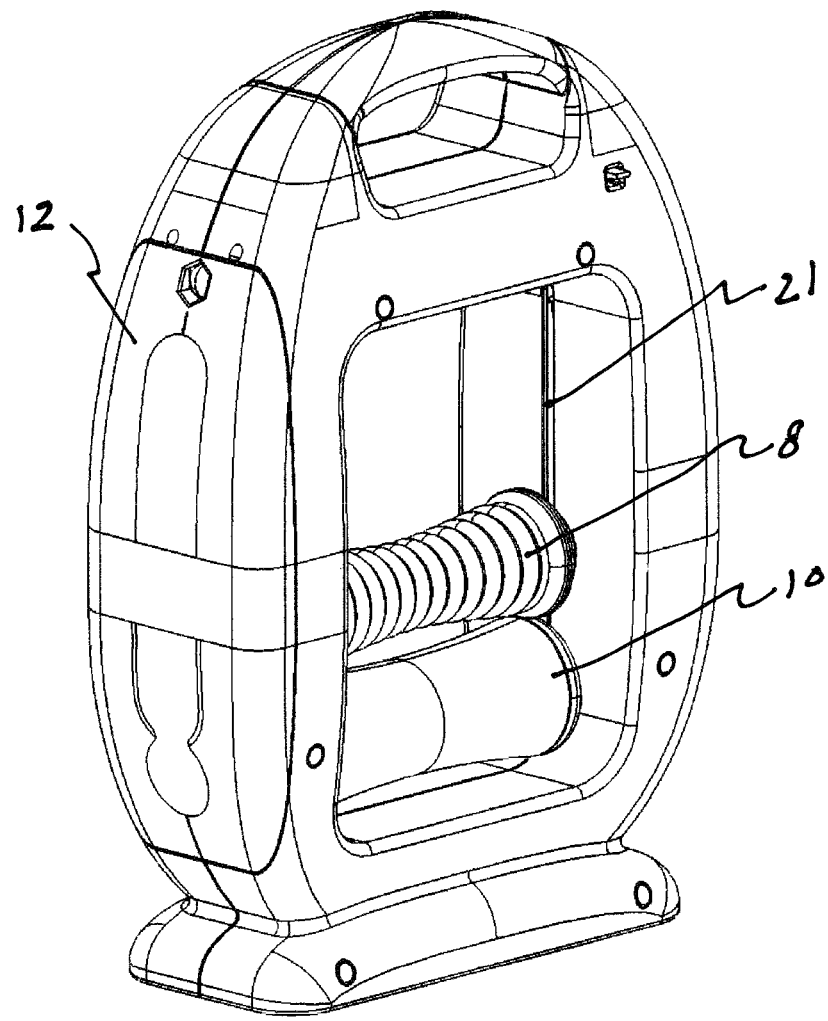
FIG. 3 is a perspective view of the massage device embodiment showing the front and the left side.
Figure 4:
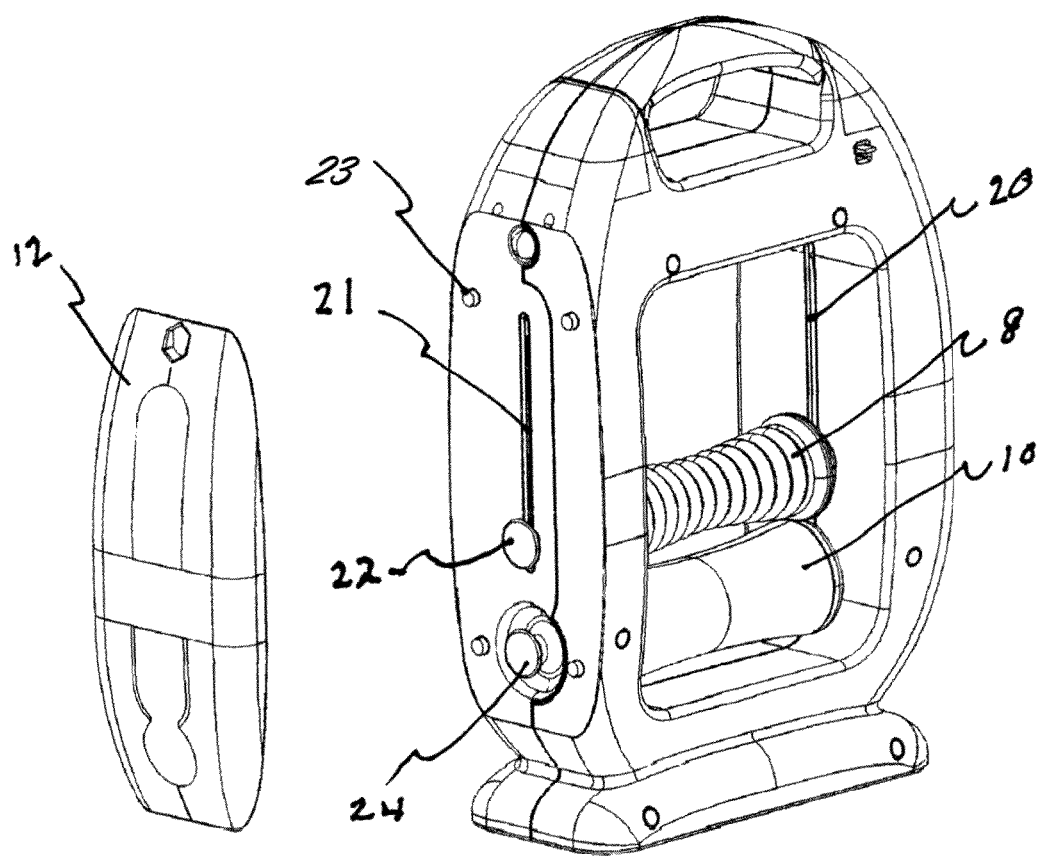
FIG. 4 is a perspective view of the left side with the roller assemblies access panel removed.

FIG. 3 is a perspective view of the massage device 100 that shows the opposite side of the housing which includes a removable roller assemblies access panel 12 as shown in FIG. 4.

FIG. 4 shows roller assemblies access panel 12 removed. The roller assemblies access panel is held in place by four magnets 23 and mating magnets on the inside wall of roller assemblies access panel 12, not shown. By removing roller assemblies access panel 12, the user has access to flat knobs 22, 24 which are connected to shafts 26, 28 and allow the user to pull out the shafts 26, 28 to remove and replace rollers when necessary.

Figure 5:
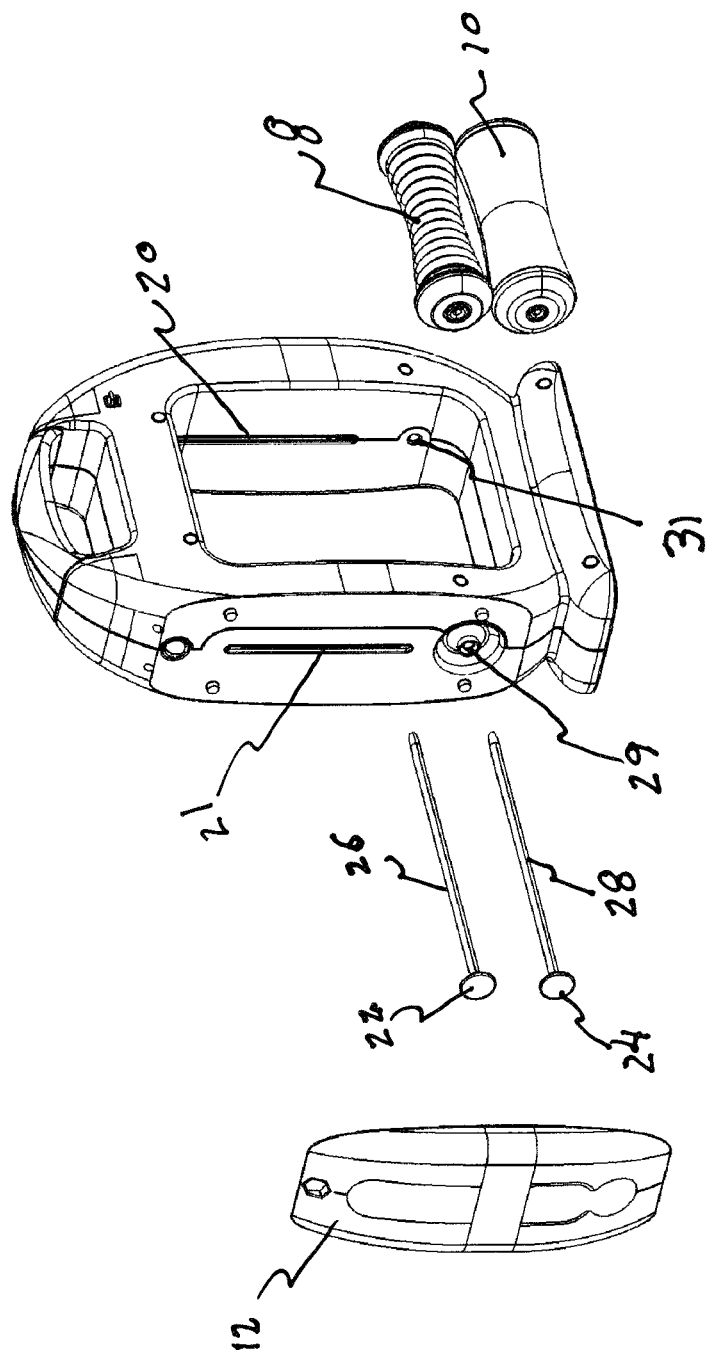
FIG. 5 is an exploded view of the massage device embodiment.

FIG. 5 is an exploded view showing end caps 22, 24 and attached shafts 26, 28 removed. The shafts 26, 28 rotatably retain rollers 8, 10. The user simply inserts the end of the shaft 28 into aperture 29 and then into roller 10 and then into aperture 31. Then he inserts shaft 26 into slot 21 then into roller 8 and finally into slot 20. A user can replace either one or both rollers 8, 10 to accommodate different massage modalities simply by removing the shafts 26, 28 by pulling on end caps 22, 24. The shafts 26, 28 and end caps 22, 24 are prevented from slipping out by their proximity to roller assemblies access panel 12 during use.

Figure 10:
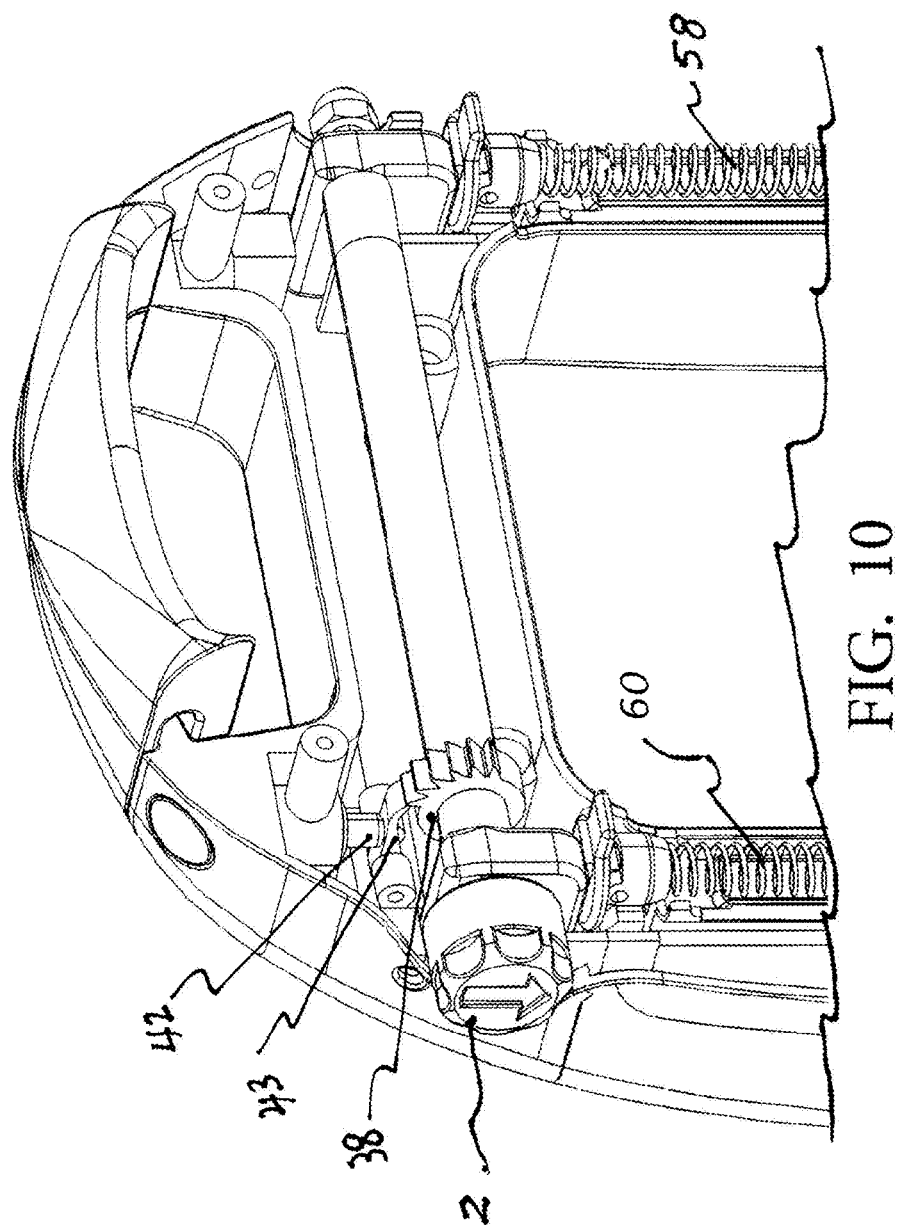
FIG. 10 is a partial section view showing the compression springs in the start position.
Figure 11:
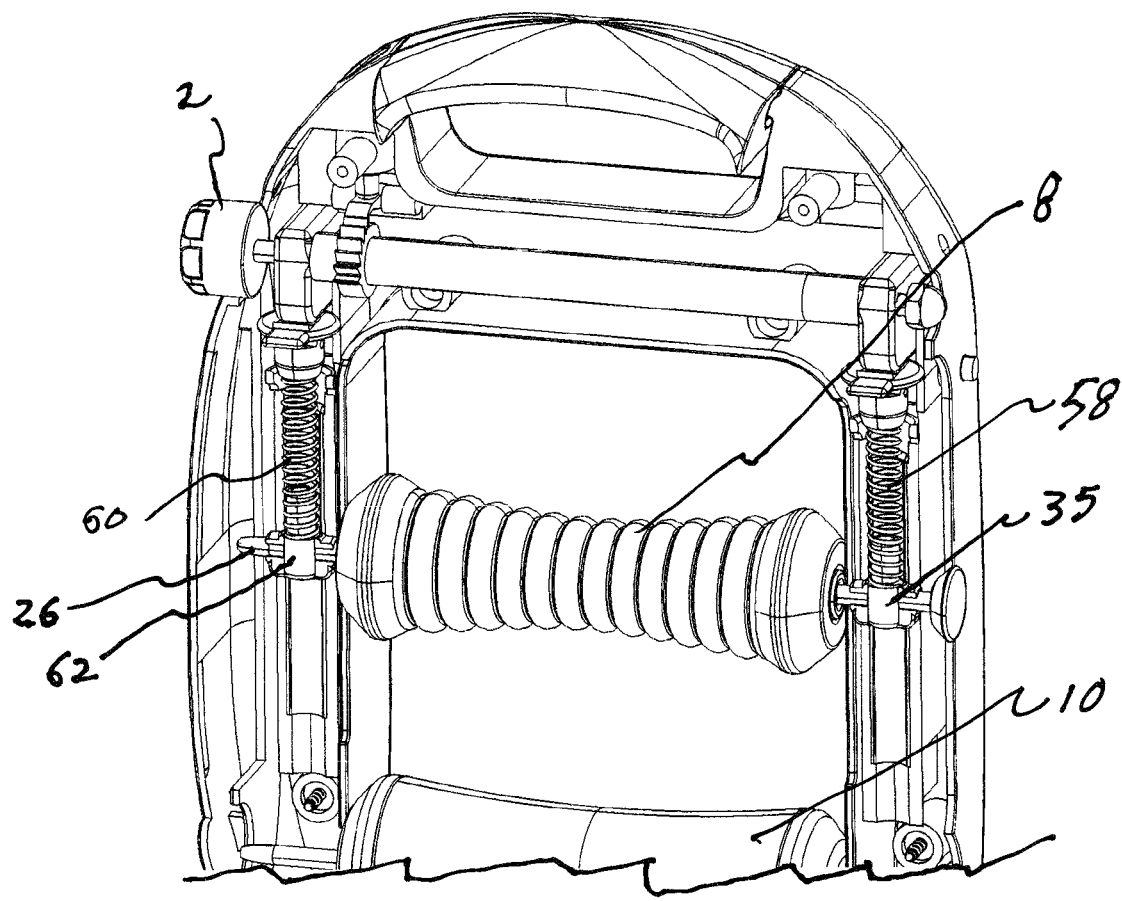
FIG. 11 is a partial section view showing the compression springs in the use position.

FIG. 6 is a front view of the massage device with the front housing cover 18 removed showing compression springs compression adjustment mechanism components including cams 36 and 37, and cross shaft 34. When the user rotates knob 2 cam 36 pushes down on spring cover plate 40. Shaft 34 extends to the opposite side of the housing and terminates in a matching cam 37 so that both compression springs 58 and 60 shown in FIGS. 10 and 11 are adjusted simultaneously. The upper roller end of shaft 26 opposite of the shaft flat knob end is retained by aperture located within the collar 35 of the compression spring 60. The flat knob end of shaft 26 passes through the aperture located within the collar 62 of the compression spring 58 and then through roller 8.

Figure 7:
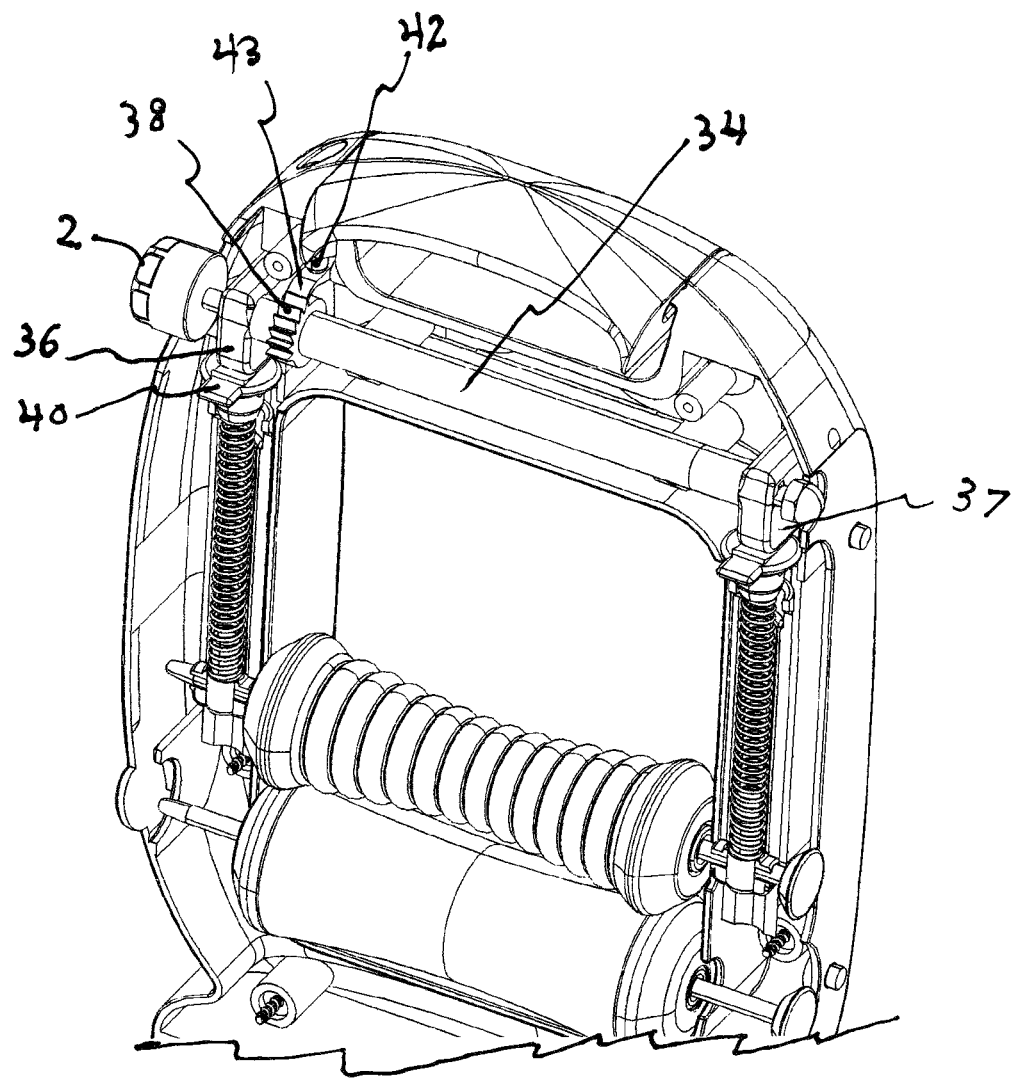
FIG. 7 is a partial perspective view showing the compression adjusting mechanism.

FIG. 7 is a partial perspective view of the top portion of the massage device 100 showing a closeup view of the cams

36, 37. A spring biased post 42 presses down on pawl 43 which engages ratchet 38 thereby holding the attached cam 36 in position after the user turns knob 2 to adjust the compression springs compression. Cross shaft 34 is rotatably held in place by retaining bracket 48, shown in FIG. 6, and terminates on each side in the cam mechanisms described above.

Figure 8:
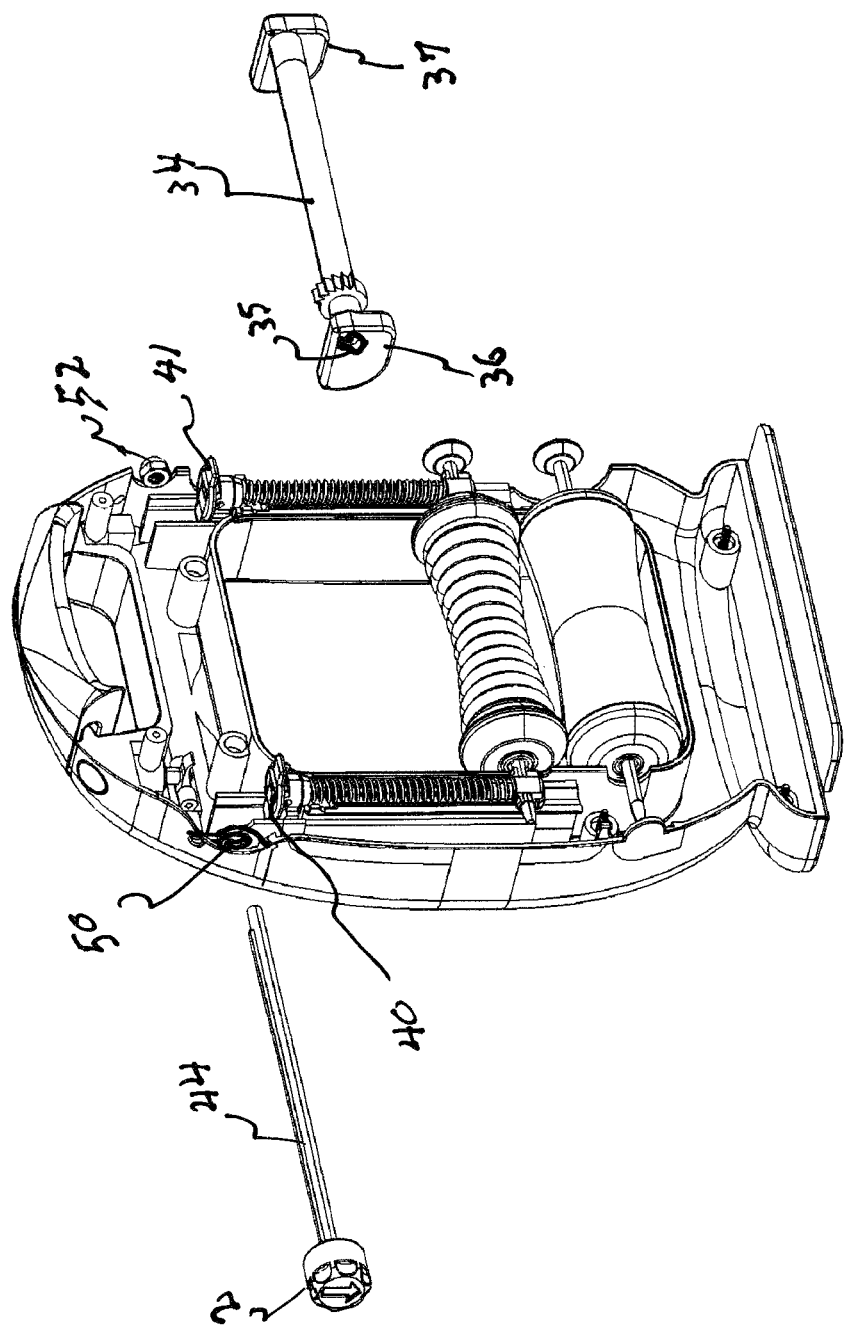
FIG. 8 is an exploded view showing the cam mechanism.

FIG. 8 is an exploded view showing cam shaft 34 and shaft 44 removed. Shaft 44 penetrates apertures 50, 52 to hold it in place. The shaft 44 is keyed so that when shaft 44 penetrates the aperture 35 of cam shaft 34, it causes cam shaft 34 to rotate as knob 2 is rotated.

Figure 9:
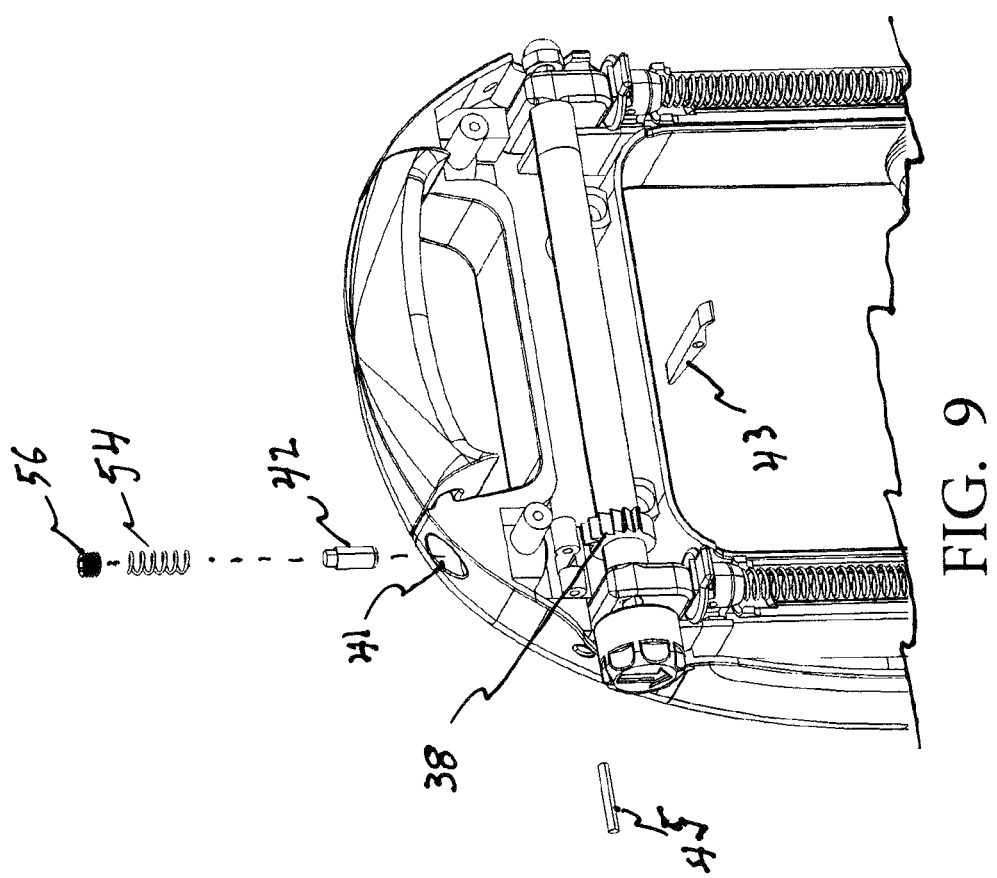
FIG. 9 is an exploded view showing the spring assists for the cam mechanism.

FIG. 9 is a partial exploded perspective view showing post 42 about to be inserted into aperture 41 and then capable of being forced down by compression spring 54 which is held down by threaded cap 56. Post 42 pushes down on pawl 43, shown removed, to help hold cams 36, 37 in place wherever the user desires to stop.

FIG. 10 shows a partial perspective view showing an enlarged version of post 42 and pawl 43 as it engages teeth on ratchet gear 38.

FIG. 11 shows compression springs 58, 60 pushed up as they would be when a user has his or her hand or forearm between rollers 8, 10.

FIGS. 1-8 and FIG. 11 show the massage device 100 with a flat surface hyperboloid roller 10 and a hyperboloid roller 8 with evenly distributed ridges. Roller's shape and type to be used is a function of underlying therapeutical problem the massage device 100 is used to treat. Most typical roller types comprise:

Flat hyperboloid roller, typically soft rubber one, to apply pressure evenly across multiple muscle groups at the same time providing a soothing effect, shown in FIGS. 1-8 and FIG. 11;

Hyperboloid roller with evenly distributed ridges, typically soft rubber, to gently massage between the metacarpals and/or provide gentler option for the forearms;

Center sphere roller, typically firm rubber, to provide intense trigger point therapy for any of the muscles of the hands and forearms;

Offset sphere roller, typically medium rubber, designed to easily access the muscles on the inside or outside of the hands and forearms, ideal for treating the muscles associated with tennis elbow and for massaging the thenar eminence;

Double sphere roller, typically medium rubber, ideal for treating carpals, and for a less intense therapeutic massage of the hands, and forearms;

FIG. 12 is a front view of the massage device 100 with a spherical roller 9 that includes a central spherical portion 9A to provide a different massage experience. Other roller shapes for both the top and bottom rollers can be provided and easily installed. An exposed end 43A of pawl 43 protrudes beyond the front surface of housing half 19 to allow the user to disengage the pawl by pushing down on the exposed end 43A thereby allowing the user to rotate knob 2 freely so that the user can return the internal cams 36, 37 to cause a lighter spring tension.

Figure 13:
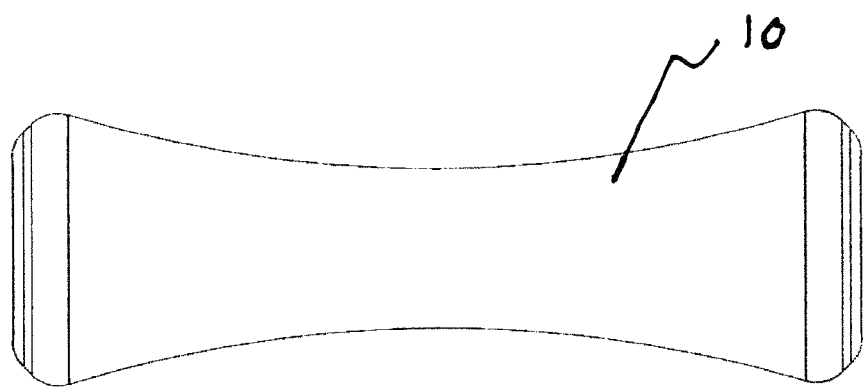
FIG. 13 is a view of the flat surface roller.

FIG. 13 is a view of the completely flat roller. The flat roller applies pressure evenly across multiple muscle groups. It is designed to stimulate the effleurage massage technique used by massage therapists to warm up the muscles before deeper work.

Figure 14:
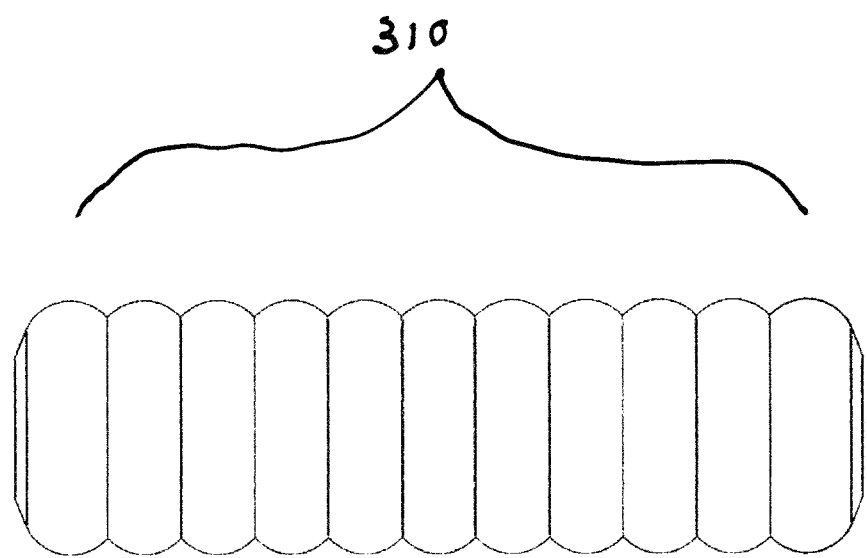
FIG. 14 is a view of the roller with evenly spaced ridges.

FIG. 14 is a view of the roller with evenly spaced ridges across the entire roller to gently massage any area of the fingers, hands, wrists, and forearms.

Figure 15:
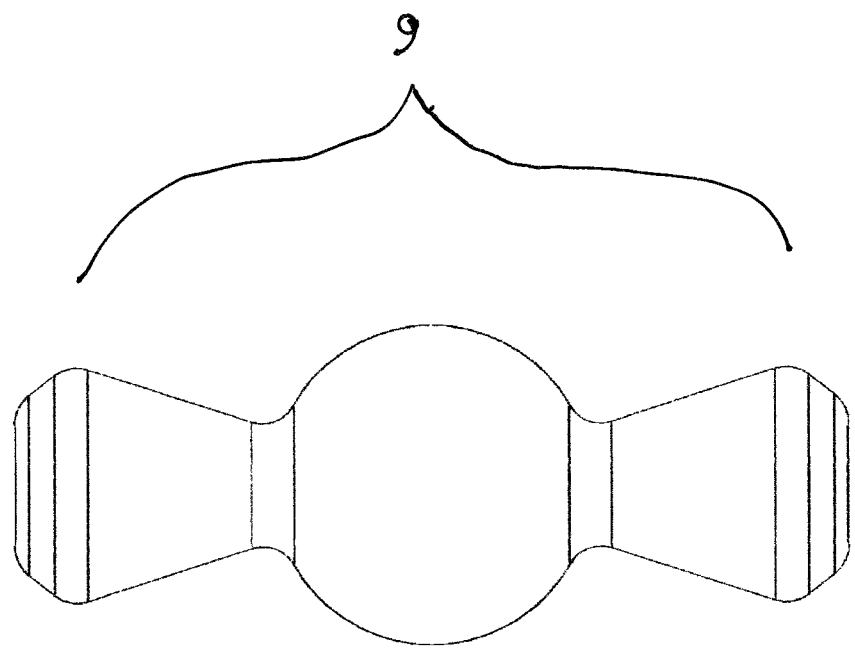
FIG. 15 is a view of the roller with a single sphere in the center of the roller.

FIG. 15 is a view of the roller with a single sphere the center, it is designed to easily access the muscles on the center of the palms, wrists, and forearms.

Figure 16:
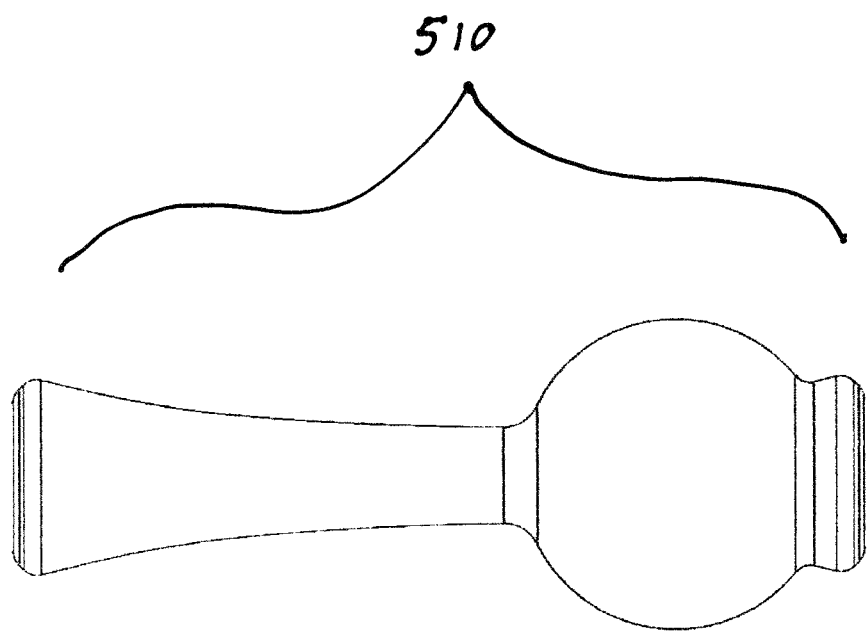
FIG. 16 is a view of the roller with a single sphere offset to one side.

FIG. 16 a view of the roller with single sphere offset to one side which allows for targeted massage of the muscles on the inside or outside of the hands, wrists, and forearms, designed specifically to easily access the muscles, ligaments, and tendons on the outside of the forearm just below the elbow that are known to cause painful tennis elbow symptoms.

Figure 17:
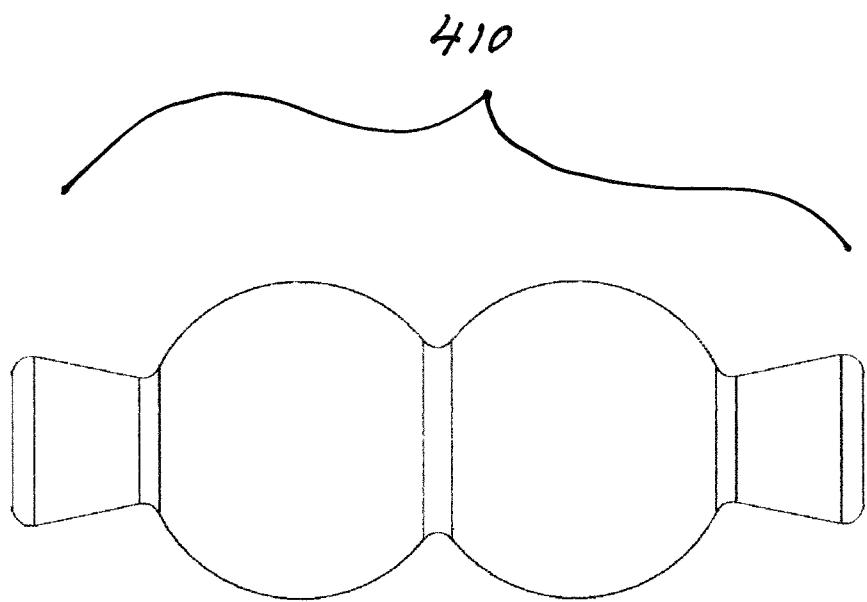
FIG. 17 is a view of the roller with two spheres in the center.

FIG. 17 is a view of the roller with two spheres in the center is designed to apply pressure evenly to both sides of the hands, wrists, and forearms.

While the massage device has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The term "top" as used in this specification and in the claims refers to an uppermost area of the massage device, essentially the handle portion.

The term "bottom" as used in this specification and in the claims refers to an area of the massage device opposite of the term "top", essentially the base portion.

The term "upper" as used in this specification and in the claims refers to an area of the massage device closer to the top.

The term "lower" as used in this specification and in the claims refers to an area of the massage device closer to the bottom, below upper.

The term "outer wall" as used in this specification and in the claims refers to the outermost visible surfaces of the massage device.

The term "inner wall" as used in this specification and in the claims refers to the visible surfaces enclosing the massage device defining an open space for accommodating a user's hand 16 and the cutout area 6 where a pair of massaging rollers is located.

Defining terms "top", "bottom", "left", and "right" is for reference only and should not be construed to mean that the massage device cannot be used in alternate orientations.

In the claims, the word "comprising" does not exclude the presence of other elements or steps then those listed in a claim. Furthermore, the terms "a" or "an," as used herein, are defined as "one, or more than one." Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are arbitrarily used to distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A cam shaft and ratchet adjustable hand and forearm therapeutic massage system comprising:
   a housing comprising:

a handle portion;
left and right hollow vertical spring housing portions;
a horizontal base portion;
a hollow horizontal spring adjustment mechanism housing portion substantially horizontally disposed under the handle portion between the left and right vertical spring housing portions;
a vertically slidable reconfigurable upper roller assembly;
a vertically fixed reconfigurable lower roller assembly;
wherein the handle portion, the hollow horizontal spring adjustment mechanism housing portion, the left vertical spring housing portion, the right vertical spring housing portion, and the horizontal base portion enclose an open rectangular space adapted to accommodate a user's hand between the vertically slidable reconfigurable upper roller assembly and the vertically fixed reconfigurable lower roller assembly;
left and right compression spring assemblies, said left and right compression spring assemblies disposed in the left and right vertical spring housing portions respectively, the left and the right vertical spring housing portions comprised of a plurality of walls, wherein walls, of the plurality of walls of the left and right spring housing portions, facing the open rectangular space each comprise aligned vertical slots;
the hollow horizontal spring adjustment mechanism housing portion comprising a spring compression adjusting mechanism, and a spring compression adjusting knob;
the left and right compression spring assemblies each comprising:
  a compression spring;
  a compression spring bottom end collar, the compression spring bottom end collar including an aperture;
  a compression spring top end, the compression spring top end including a flat circular cap;
wherein furthermore:
  the lower vertically fixed reconfigurable roller assembly comprising a freely rotatable roller disposed in the open rectangular space on a removable shaft;
  the removable shaft extending through apertures in the spring housing portions' walls wherein one end of the removable shaft comprising a flat circular head;
  the vertically slidable reconfigurable upper roller assembly comprising a freely rotatable roller disposed in the open rectangular space on a removable shaft;
  the removable shaft, of the vertically slidable reconfigurable upper roller assembly, extending through the aligned vertical slots and through the apertures in the compression springs bottom end collars, one end of the removable shaft, of the vertically slidable reconfigurable upper roller assembly, comprising a flat circular head;
  the hand and forearm therapeutic massage system further comprising a removable roller assemblies' access panel, the access panel being removably disposed on a right spring housing portion wall, of the plurality of walls, wherein the access panel is removably held attached to the right spring housing portion wall with a plurality of magnets, whereby access to each of the flat circular heads of the removable shafts is provided when shafts when the access panel is removed;
wherein the adjusting mechanism comprises:
  a rotatable cam shaft extending through the spring adjustment housing portion apertures;
  left and right replaceable cams;
  a ratchet gear;
  a pawl;
  a compression spring pressing on a pawl engaging the ratchet gear;
  the compression spring force adjusting knob is attached to the cam shaft rotatably disposed on the spring adjustment mechanism portion left wall, the compression spring force adjusting knob comprising a compression spring pointer; and
  a circularly disposed scale being pointed at by the compression spring pointer.

* * * * *